United States Patent
DiFalco et al.

(10) Patent No.: US 10,264,022 B2
(45) Date of Patent: *Apr. 16, 2019

(54) INFORMATION TECHNOLOGY GOVERNANCE AND CONTROLS METHODS AND APPARATUSES

(71) Applicant: Tripwire, Inc., Portland, OR (US)

(72) Inventors: Robert DiFalco, Portland, OR (US); Kenneth L. Keeler, Lake Oswego, OR (US); Robert L. Warmack, West Linn, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,243

(22) Filed: Feb. 5, 2016

(65) Prior Publication Data

US 2016/0234254 A1 Aug. 11, 2016

Related U.S. Application Data

(63) Continuation of application No. 13/465,935, filed on May 7, 2012, now Pat. No. 9,256,841, which is a continuation of application No. 11/463,580, filed on Aug. 9, 2006, now Pat. No. 8,176,158.

(60) Provisional application No. 60/706,938, filed on Aug. 9, 2005.

(51) Int. Cl.
*H04L 29/06* (2006.01)
*G06Q 10/00* (2012.01)
*G06Q 10/06* (2012.01)
*G06F 17/30* (2006.01)

(52) U.S. Cl.
CPC ........ *H04L 63/20* (2013.01); *G06F 17/30088* (2013.01); *G06Q 10/00* (2013.01); *G06Q 10/0637* (2013.01); *H04L 63/102* (2013.01)

(58) Field of Classification Search
None
See application file for complete search history.

(56) References Cited

U.S. PATENT DOCUMENTS

| | | |
|---|---|---|
| 5,063,523 A | 11/1991 | Vrenjak |
| 5,542,047 A | 7/1996 | Armstrong |
| 5,655,081 A | 8/1997 | Bonnell et al. |
| 5,745,669 A | 4/1998 | Hugard et al. |
| 5,764,913 A | 6/1998 | Jancke et al. |
| 5,778,184 A | 7/1998 | Brownmiller et al. |
| 5,845,062 A | 12/1998 | Branton et al. |
| 5,878,408 A | 3/1999 | Van Huben et al. |

(Continued)

OTHER PUBLICATIONS

Kim et al., "The Design and Implementation of Tripwire: A File System Integrity Checker," (1993) Computer Science Technical Reports, 23 pages.

(Continued)

*Primary Examiner* — Farid Homayounmehr
*Assistant Examiner* — Olanrewaju J. Bucknor
(74) *Attorney, Agent, or Firm* — Klarquist Sparkman, LLP

(57) ABSTRACT

Embodiments of the present invention provide methods and systems for automated change audit of an enterprise's IT infrastructure, including independent detection of changes, reconciliation of detected changes and independent reporting, to effectuate a triad of controls on managing changes within the IT infrastructure, preventive controls, detective controls and corrective controls.

14 Claims, 6 Drawing Sheets

(56) References Cited

U.S. PATENT DOCUMENTS

| | | | |
|---|---|---|---|
| 5,913,036 A | 6/1999 | Brownmiller et al. | |
| 5,913,037 A | 6/1999 | Spofford et al. | |
| 5,933,838 A | 8/1999 | Lomet | |
| 5,963,959 A | 10/1999 | Sun et al. | |
| 6,041,347 A | 3/2000 | Harsham et al. | |
| 6,052,722 A | 4/2000 | Taghadoss | |
| 6,064,656 A | 5/2000 | Angal et al. | |
| 6,070,244 A | 5/2000 | Orchier et al. | |
| 6,072,777 A | 6/2000 | Bencheck et al. | |
| 6,122,639 A | 9/2000 | Babu et al. | |
| 6,122,664 A | 9/2000 | Boukobza et al. | |
| 6,125,390 A | 9/2000 | Touboul | |
| 6,144,993 A | 11/2000 | Fukunaga et al. | |
| 6,195,689 B1 | 2/2001 | Bahlmann | |
| 6,222,827 B1 | 4/2001 | Grant et al. | |
| 6,253,339 B1 | 6/2001 | Tse et al. | |
| 6,272,537 B1 | 8/2001 | Kekic et al. | |
| 6,341,287 B1 | 1/2002 | Sziklai et al. | |
| 6,356,885 B2 | 3/2002 | Ross et al. | |
| 6,393,386 B1 | 5/2002 | Zager et al. | |
| 6,393,474 B1 | 5/2002 | Eichert et al. | |
| 6,493,755 B1 | 12/2002 | Hansen et al. | |
| 6,535,512 B1 | 3/2003 | Daniel et al. | |
| 6,647,400 B1 | 11/2003 | Moran | |
| 6,658,568 B1 | 12/2003 | Ginter et al. | |
| 6,664,978 B1 | 12/2003 | Kekic et al. | |
| 6,701,345 B1 | 3/2004 | Carley et al. | |
| 6,742,114 B1 | 5/2004 | Carter et al. | |
| 6,751,661 B1 | 6/2004 | Geddes | |
| 6,853,987 B1 | 2/2005 | Cook | |
| 6,886,047 B2 | 4/2005 | Leong et al. | |
| 6,895,414 B2 | 5/2005 | Ford et al. | |
| 6,957,227 B2 | 10/2005 | Fogel et al. | |
| 6,983,317 B1 | 1/2006 | Bishop et al. | |
| 7,016,888 B2 | 3/2006 | Slemmer et al. | |
| 7,035,877 B2 | 4/2006 | Markham et al. | |
| 7,039,698 B2 | 5/2006 | Slemmer et al. | |
| 7,051,050 B2 | 5/2006 | Chen et al. | |
| 7,058,861 B1 | 6/2006 | Adams | |
| 7,065,767 B2 | 6/2006 | Kambhammettu et al. | |
| 7,080,037 B2 | 7/2006 | Burger et al. | |
| 7,082,554 B2 | 7/2006 | Wilson et al. | |
| 7,131,037 B1 * | 10/2006 | LeFaive | H04L 41/0631 714/46 |
| 7,158,985 B1 | 1/2007 | Liskov | |
| 7,159,036 B2 | 1/2007 | Hinchliffe et al. | |
| 7,228,460 B2 | 6/2007 | Pomaranski et al. | |
| 7,243,348 B2 | 7/2007 | Good et al. | |
| 7,290,164 B1 | 10/2007 | Harvey et al. | |
| 7,316,016 B2 | 1/2008 | DiFalco | |
| 7,317,693 B1 | 1/2008 | Roesch et al. | |
| 7,360,099 B2 | 4/2008 | DiFalco et al. | |
| 7,474,425 B2 | 1/2009 | Sasama | |
| 7,529,197 B2 | 5/2009 | Shell et al. | |
| 7,587,754 B2 | 9/2009 | DiFalco et al. | |
| 7,590,669 B2 | 9/2009 | Yip et al. | |
| 7,600,007 B1 * | 10/2009 | Lewis | G06Q 10/04 709/223 |
| 7,603,440 B1 | 10/2009 | Grabowski et al. | |
| 7,620,715 B2 * | 11/2009 | DiFalco | G06F 11/0751 709/224 |
| 7,636,736 B1 | 12/2009 | Kumar et al. | |
| 7,673,147 B2 * | 3/2010 | Moghe | H04L 63/1416 713/182 |
| 7,765,460 B2 | 7/2010 | DiFalco et al. | |
| 7,774,791 B1 * | 8/2010 | Appelbaum | G06Q 10/06 705/1.1 |
| 7,822,724 B2 | 10/2010 | DiFalco et al. | |
| 8,090,677 B2 | 1/2012 | Murphy et al. | |
| 8,140,635 B2 | 3/2012 | DiFalco | |
| 8,176,158 B2 | 5/2012 | DiFalco et al. | |
| 8,443,445 B1 | 5/2013 | Andruss et al. | |
| 8,914,341 B2 | 12/2014 | DiFalco | |
| 9,209,996 B2 | 12/2015 | DiFalco | |
| 9,256,841 B2 | 2/2016 | DiFalco | |
| 2001/0044840 A1 | 11/2001 | Carleton | |
| 2001/0052010 A1 | 12/2001 | Kim | |
| 2002/0026339 A1 | 2/2002 | Frankland et al. | |
| 2002/0035561 A1 | 3/2002 | Archer et al. | |
| 2002/0069274 A1 | 6/2002 | Tindal et al. | |
| 2002/0107958 A1 * | 8/2002 | Faraldo, II | H04L 41/00 709/224 |
| 2002/0116363 A1 | 8/2002 | Grainger | |
| 2002/0156799 A1 | 10/2002 | Markel | |
| 2002/0176378 A1 | 11/2002 | Hamilton et al. | |
| 2002/0188711 A1 | 12/2002 | Meyer et al. | |
| 2003/0005109 A1 | 1/2003 | Kambhammettu et al. | |
| 2003/0008662 A1 | 1/2003 | Stern et al. | |
| 2003/0101341 A1 | 5/2003 | Kettler et al. | |
| 2003/0110280 A1 | 6/2003 | Hinchliffe et al. | |
| 2003/0149756 A1 | 8/2003 | Grieve et al. | |
| 2003/0172151 A1 | 9/2003 | Schade | |
| 2003/0197743 A1 | 10/2003 | Hill et al. | |
| 2003/0202201 A1 | 10/2003 | Muto et al. | |
| 2003/0204517 A1 | 10/2003 | Skinner et al. | |
| 2003/0217134 A1 | 11/2003 | Fontoura et al. | |
| 2003/0233431 A1 | 12/2003 | Reddy et al. | |
| 2004/0006614 A1 | 1/2004 | DiFalco | |
| 2004/0024843 A1 | 2/2004 | Smith | |
| 2004/0059770 A1 | 3/2004 | Bossen | |
| 2004/0059930 A1 | 3/2004 | DiFalco et al. | |
| 2004/0060046 A1 | 3/2004 | Good et al. | |
| 2004/0068562 A1 | 4/2004 | Tilton et al. | |
| 2004/0122962 A1 | 6/2004 | DiFalco et al. | |
| 2004/0123133 A1 | 6/2004 | DiFalco et al. | |
| 2004/0153875 A1 | 8/2004 | Amyot et al. | |
| 2004/0186903 A1 | 9/2004 | Lambertz | |
| 2004/0205182 A1 | 10/2004 | Geddes | |
| 2004/0243600 A1 | 12/2004 | Ikeda et al. | |
| 2004/0252693 A1 | 12/2004 | Cheriton et al. | |
| 2004/0254927 A1 | 12/2004 | Lang et al. | |
| 2004/0260803 A1 | 12/2004 | Nakamura | |
| 2005/0005169 A1 | 1/2005 | Kelekar | |
| 2005/0015622 A1 | 1/2005 | Williams et al. | |
| 2005/0043961 A1 | 2/2005 | Torres et al. | |
| 2005/0071642 A1 * | 3/2005 | Moghe | H04L 63/1416 713/182 |
| 2005/0096949 A1 | 5/2005 | Aiber et al. | |
| 2005/0097199 A1 | 5/2005 | Woodard et al. | |
| 2005/0120101 A1 | 6/2005 | Nocera | |
| 2005/0149578 A1 | 7/2005 | Sustman et al. | |
| 2005/0165790 A1 * | 7/2005 | Seliger | G06F 21/6218 |
| 2005/0165954 A1 | 7/2005 | Burdick et al. | |
| 2005/0177600 A1 | 8/2005 | Eilam et al. | |
| 2005/0207553 A1 | 9/2005 | Fleck et al. | |
| 2005/0256787 A1 | 11/2005 | Wadawadigi et al. | |
| 2005/0278191 A1 | 12/2005 | DiFalco et al. | |
| 2005/0278453 A1 | 12/2005 | Cherkasova | |
| 2006/0025985 A1 | 2/2006 | Vinberg et al. | |
| 2006/0031529 A1 | 2/2006 | Keith, Jr. | |
| 2006/0036560 A1 | 2/2006 | Fogel | |
| 2006/0080656 A1 | 4/2006 | Cain et al. | |
| 2006/0085403 A1 * | 4/2006 | Harrison | G06Q 30/02 |
| 2006/0143685 A1 | 6/2006 | Vasishth et al. | |
| 2006/0149704 A1 | 7/2006 | Wyatt et al. | |
| 2006/0195905 A1 | 8/2006 | Fudge | |
| 2006/0212477 A1 | 9/2006 | Murphy et al. | |
| 2006/0212487 A1 * | 9/2006 | Kennis | G06F 17/30569 |
| 2006/0224663 A1 | 10/2006 | DiFalco | |
| 2006/0224742 A1 * | 10/2006 | Shahbazi | H04L 63/105 709/226 |
| 2006/0242277 A1 | 10/2006 | Torrence et al. | |
| 2006/0248084 A1 * | 11/2006 | Sack | G06F 21/6227 |
| 2006/0277080 A1 * | 12/2006 | DeMartine | G06Q 10/04 705/7.36 |
| 2007/0005320 A1 | 1/2007 | Vinberg et al. | |
| 2007/0005740 A1 | 1/2007 | DiFalco et al. | |
| 2007/0022365 A1 | 1/2007 | DiFalco et al. | |
| 2007/0028303 A1 | 2/2007 | Brennan | |
| 2007/0043674 A1 | 2/2007 | DiFalco et al. | |
| 2007/0043786 A1 | 2/2007 | DiFalco et al. | |
| 2007/0124255 A1 | 5/2007 | DiFalco et al. | |

(56) References Cited

U.S. PATENT DOCUMENTS

| | | | |
|---|---|---|---|
| 2007/0180490 A1* | 8/2007 | Renzi | G06F 21/577 726/1 |
| 2007/0214193 A1 | 9/2007 | Takahashi et al. | |
| 2008/0082374 A1* | 4/2008 | Kennis | G06F 17/30569 705/7.36 |
| 2008/0104217 A1 | 5/2008 | Srinivasa et al. | |
| 2008/0126377 A1 | 5/2008 | Bush et al. | |
| 2008/0229262 A1 | 9/2008 | Harashima et al. | |
| 2009/0171732 A1 | 7/2009 | Bobak et al. | |
| 2009/0183236 A1 | 7/2009 | Ben-Ezra et al. | |
| 2009/0204701 A1 | 8/2009 | Herzog et al. | |
| 2010/0005107 A1 | 1/2010 | DiFalco | |
| 2011/0137905 A1 | 6/2011 | Good et al. | |
| 2011/0138038 A1 | 6/2011 | Good et al. | |
| 2011/0138039 A1 | 6/2011 | Good et al. | |
| 2011/0197094 A1 | 8/2011 | Wagner | |
| 2011/0197189 A1 | 8/2011 | Wagner et al. | |
| 2011/0197205 A1 | 8/2011 | Wagner et al. | |
| 2012/0023076 A1 | 1/2012 | Torrence et al. | |

OTHER PUBLICATIONS

Kim et al., "Experiences with Tripwire: Using Integrity checkers for Intrusion Detection," (1994) Computer Science Technical Reports, 15 pages.

Derbort et al., "conversion of a Rule Based to an Object Oriented Expert System," *IEEE*, pp. 751-754 (1991).

IEEE 100: The Authoritiative Dictionary of IEEE Standards Terms, Seventh Edition, p. 407 (2000).

Kerschberg et al., "Intelligent Network Management: A Heterogeneous Knowledge Source Approach," *IEEE*, pp. 314-316 (1990).

Parnas, "On the Criteria to Be Used in Decomposing Systems into Modules," *Communications of the ACM*, vol. 15, No. 12, pp. 1053-1058 (Dec. 1972).

Case et al., "A Simple Network Management Protocol (SNMP)," RFC1157, 32 pp. (May 1990).

Visa U.S.A., Inc., "Payment Card Industry Data Security Standard," Version 1.0, 12 pp. (Dec. 15, 2004).

\* cited by examiner

INFORMATION TECHNOLOGY GOVERNANCE AND CONTROLS METHODS AND APPARATUSES

CROSS REFERENCE TO RELATED APPLICATIONS

The present application is a continuation of U.S. patent application Ser. No. 13/465,935, filed May 7, 2012, which is a continuation of U.S. patent application Ser. No. 11/463,580, filed Aug. 9, 2006, now U.S. Pat. No. 8,176,158, which is a continuation of and claims priority to U.S. Provisional Patent Application No. 60/706,938, filed Aug. 9, 2005, entitled "Information Technology Governance and Controls," the entire disclosures of which are hereby incorporated by reference in their entirety.

TECHNICAL FIELD

Embodiments of the present invention relate to the field of controlling information technology infrastructure, and more particularly, to preventive, detective and corrective control of information technology infrastructure of an enterprise, including proving existence and/or effectiveness of the control.

BACKGROUND

In virtually every industry, the success of an organization is inextricably linked to the reliability, availability and security of its Information Technology (IT). Consequently, IT management must identify and analyze the relevant risks facing its production environment and then put controls in place to prevent, detect and correct for them. Not only are these controls required for effective management, they are also good for business and fundamental to meeting regulatory compliance requirements.

Unauthorized access due to security breaches is a high-profile risk. Hackers outside the network, or more likely, employees or contractors with mean motive and opportunity, manage to bypass or defeat security defenses and make malicious changes to software files and system configurations. These unauthorized changes can have dire consequences, such as financial loss, disruptions to IT operations, and negative public perception.

Although security often gets the spotlight, the much greater risks to the organization are system reliability and availability issues. Garner asserts that "80 percent of unplanned downtime is caused by people and process issues, including poor change management practices, while the remainder is caused by technology failure and disasters," IDC cites similar findings that indicate that operator error is the single largest source of outages causing nearly 60 percent of overall infrastructure downtime. Many IT organizations, in the spirit of being nimble and response to their customers, are actually putting themselves at risk in the everyday process of making changes to their own systems.

If industry analysts are correct, and practical experience certainly indicates that they are, the greatest point of leverage for increasing the overall reliability, availability and security of information systems, and addressing related compliance requirements, is controlling change across the IT infrastructure.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Figure 1:
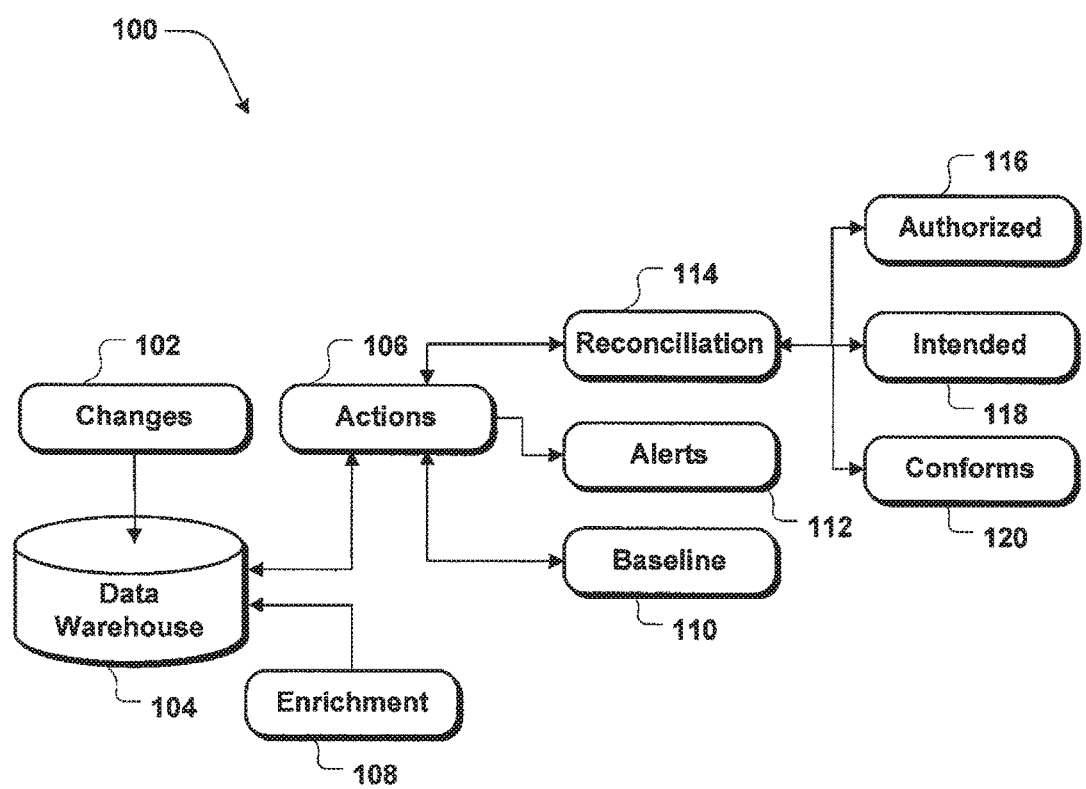
FIG. 1 schematically illustrates some aspects of an automated change audit system, in accordance with various embodiments of this invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)", For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide an automated change auditing system. Embodiments of the present invention provide a triad of controls: preventive, detective, and corrective. Preventive controls include controls that define the rotes and responsibilities, processes, and policies intended to manage change management risks. Detective controls include controls that automatically track and reconcile production changes, and detect when preventive control fails. Corrective controls include controls that provide recovery mechanisms to mitigate the impact of failed changes. Embodiments of the invention allow the three controls may be independently exercised. Further, verifiable evidence is provided proving that not only each control exists, but the controls are effective against the identified risks.

Embodiments of the present invention include, but are not limited to, independent detecting of changes regardless of source or content, reconciling detected changes with intended and authorized changes, and independent reporting of all change activity across production systems. In various embodiments, the method may include facilitating homogeneous monitoring of a plurality of heterogeneous data processing nodes of the data processing environment, the homogeneous monitoring including facilitating detecting one or more changes of one or more elements of the plurality of heterogeneous data processing nodes. In various embodiments, the method may further include facilitating performing one or more actions in response to detecting the one or more changes. Other embodiments of the present invention may include, but are not limited to, apparatuses and systems adapted to facilitate practice of the above-described method. While portions of the following discussion may be primarily presented in the context of specific types of data processing devices, it is understood that the principles described herein apply to a broad range of data processing devices.

Various embodiments of the present invention include a scalable architecture to facilitate a change audit method in data processing environments containing data processing devices. Such data processing devices may include, but are not limited to, networking devices, servers, desktop computers, laptop computers, tablet computers, personal digital assistants, cellular phones, set top boxes, media players, or other types of data processing devices. In some embodiments, a data processing environment may comprise a continuously or intermittently connected environment of data processing devices, including data processing devices communicating through the Internet. In some embodiments, a data processing environment may comprise a directly or indirectly connected environment of data processing devices, including data processing devices communicating through the Internet. In various embodiments, one or more modules may facilitate the operations described herein.

FIG. 1 illustrates some aspects of a change audit system 100, in accordance with various embodiments of this invention. In various embodiments, change audit system 100 may include one or more of the following: changes monitoring/detection operation 102, data warehouse 104, enrichment operation 108, actions operation 106, baseline operation 110, alerts/reporting operation 112, reconciliation operation 114, authorized reconciliation operation 116, intended reconciliation operation 118, and/or conforms reconciliation operation 120. In various embodiments, change audit system 100 may include other operations. While certain operations are illustrated in FIG. 1, other operations may supplement or supplant the operations shown, in the context of various embodiments. In various embodiments, change audit system 100 may operate in the context of a data processing environment comprising one or more data processing devices. In various embodiments, these data processing devices may comprise a wide range of data processing devices, such as, but not limited to, a networking device (a router, a switch, a gateway, or the like), a server, a desktop computer, a laptop computer, a tablet computer, a personal data assistant, a cellular phone, a set top box, a media player, or the like. In various embodiments, portions or all of change audit system 100 may be referred to as a change audit apparatus.

In various embodiments, change audit system 100 may include changes monitoring/detecting operation 102. In various embodiments, changes monitoring/detecting operation 102 may facilitate independent homogeneous monitoring of a plurality of heterogeneous data processing nodes (not shown) of a data processing environment, with the homogeneous monitoring including facilitating detecting one or more changes of one or more elements of the plurality of heterogeneous data processing nodes, including but not limited to a far flung mix of servers, routers, firewalls, databases etc. In various embodiments, changes monitoring/detecting operation 102 may facilitate performing one or more actions in response to detecting the one or more changes. In various embodiments, the one or more actions may be termed one or more responses.

In other words, monitoring/detecting operation 102 is segregated from the persons or technologies making the changes. Operation 102 detects changes regardless who made the change or why the change was made. It captures automated and manual changes, authorized and intended changes, as well as the occasional unauthorized, unintended, or potentially malicious change, in sufficient detail to determine the date, time, implementer, system, and the details of changes made.

In various embodiments, the facilitating detecting one or more changes may comprise facilitating taking snapshots of states of one or more elements of the plurality of heterogeneous data processing nodes. In various embodiments, at least some of the snapshots may be stored in data warehouse 104. In various embodiments, one or more versions of the one or more elements may be stored in data warehouse 104. In various embodiments, memorializations of changes of the one or more elements may be stored in data warehouse 104. In various embodiments, other items may be stored in data warehouse 104. In various embodiments, data warehouse 104 may comprise any type of data store or data storage place.

In various embodiments, change audit system 100 may include enrichment operation 108. In various embodiments, enrichment operation 108 may include facilitating correlating one of the one or more changes to one or more events associated with an element, and may further include reporting the detected change for the element, supplemented with one or more of the correlated events of the element. In various embodiments, an element may comprise, for example, a file of a data processing device. In various embodiments, an element may comprise another component of a data processing device. In various embodiments, an element may comprise data itself. In various embodiments, enrichment operation 108 may involve enriching at least some of the data stored in data warehouse 104 with events from a wide range of sources (not shown), such as, but not limited to, event or audit logs, a package manager, an installation engine of programs, etc.

In various embodiments, changes monitoring/detecting operation's 102 facilitating homogeneous monitoring of the plurality of heterogeneous data processing nodes may comprise defining a first logical grouping of one or more data processing nodes to be monitored, with the one or more data processing nodes corresponding to one or more data processing node-types. In various embodiments, changes monitoring/detecting operation's 102 facilitating homogeneous monitoring may further comprise defining a second logical grouping of one or more rules to be asserted against at least a subset of the first logical grouping of data processing nodes, with each of the one or more rules identifying criteria for detecting an operational state change of one or more data processing nodes. In various embodiments, changes monitoring/detecting operation's 102 facilitating homogeneous monitoring may further comprise generating one or more monitoring tasks, with each of the monitoring tasks defining which ones of the second logical grouping of rules to assert against which ones of the first logical grouping of one or more data processing nodes.

In various embodiments, change audit system 100 may include actions operation 106. In various embodiments, actions operation 106 may include one or more actions, such as, for example, reconciliation operation 114, alerts/reporting operation 112, and baseline operation 110.

In various embodiments, alerts/reporting operation 112 may include independent alerting/reporting a detected change. Independent alerting/reporting may provides IT management and auditors proof of systems and process integrity by generating an independent accounting of actual changes across the breadth of the infrastructure, reconciled with authorized and intended changes. The alerts/reports may offer ongoing proof that effective change controls are in place, as well as provide decision support tools for problem management.

Alerting/reporting a detected change may take many forms, according to various embodiments, including but not limited to, creating a helpdesk incident, alerting with a severity state indicator of the change in a GUI, notifying a user (for example, a system administrator) of the detected change, reverting the element (or a portion of the element) back to its baseline state, etc. In various embodiments, alerts/reporting operation 112 may include facilitating a user to modify the element at issue. In various embodiments, alerts/reporting operation 112 may include other sub-operations. In various embodiments, alerts/reporting operation 112 may operate in conjunction with one or more of the reconciliation operations of: authorized operation 116, intended operation 118, and/or conforms operation 120. In various embodiments, alerts/reporting operation 112 may operate in conjunction conjunction with additional and/or alternative reconciliation operations.

In various embodiments, reconciliation operation 114 determines whether changes are authorized and intended, and independently validates the changes occurred as planned. Reconciliation operation 114 further filters out to uncover any undesired changes. In the event a change can't be correlated back to change approval or release management processes, reconciliation operation 114 assumes preventive controls have been comprised and corrective controls must be triggered.

In various embodiments, reconciliation operation 114 may comprise determining whether at least one of the one or more detected changes was authorized via authorized operation 116. In various embodiments, authorized operation 116 may include learning of a submission of a request, in digital form, to make a modification. In various embodiments, authorized operation 116 may further include determining whether to allow the requested modification to be scheduled or assigned for implementation, in response to learning of the submission of the request. In various embodiments, authorized operation 116 may further include conditionally indicating allowance of the requested modification, based at least in part on the result of the determining whether to allow the requested modification to be scheduled or assigned for implementation. In various embodiments, authorized operation 116 may operate in the context of determining whether a detected change is associated with a work ticket, a maintenance window, or the like. In various embodiments, authorized operation 116 may operate in the context of determining whether a detected change was "planned" or "unplanned."

In various embodiments, reconciliation operation 114 may comprise determining whether at least one of the one or more detected changes was intended via intended operation 118. In various embodiments, intended operation 118 may include facilitating creation in digital form of a first memorialization of at least one of the one or more changes. In various embodiments, intended operation 118 may further include facilitating comparison of the first memorialization to a second memorialization of one or more in-band changes that should have been made to facilitate detection of one or more out-of-band changes. In various embodiments, intended operation 118 may be performed in the context of reconciling a detected change with changes made by a change agent (not shown), or changes in-band to such a change agent. In various embodiments, such a change agent may include, but not be limited to, a configuration management tool. In various embodiments, intended operation 118 may operate in the context of determining whether a detected change is "known" or "unknown."

In various embodiments, reconciliation operation 114 may comprise determining whether at least one of the one or more detected changes was conforming via conforms operation 120. In various embodiments, conforms operation 120 may include determining whether at least one of the one or more changes conforms with a conformance authority, with the conformance authority having one or more guidelines. In various embodiments, the conformance authority may include, but not be limited to, a policy-based management tool. In various embodiments, conforms operation 120 may operate in the context of determining whether a detected change was "desirable" or "undesirable."

In various embodiments, a change audit method may be performed to maintain or demonstrate control of an enterprise's information technology (IT) infrastructure, for the purpose of maintaining or demonstrating control of an enterprise's financial systems or data. In various embodiments, a change audit method may be performed to maintain or demonstrate control of an enterprise's business processes, such as, for example, enterprise resource planning (ERP) or customer relationship management (CRM), and/or the integrity of its data, e.g. business, design, engineering, personnel and/or customer confidential data. Customer confidential data may include credit card and other financial data, patient records, and on forth. In various embodiments, a change audit method may be performed to facilitate compliance with governmental laws/regulations regarding establishment and maintenance of an internal control structure and/or procedures for financial reporting, such as, for example, the Sarbanes-Oxley Act (the Public Company Accounting Reform and Investor Protection Act), including any amendments and/or successor Acts to any part of the Sarbanes-Oxley Act, or the like.

In various embodiments, a change audit method may be performed to facilitate compliance with a number of laws, regulations, or guidelines, including but not limited to, the Gramm Leach Bliley Act (GLBA), the regulations of Food and Drug Administration 21 Code of Federal Regulations 11, the Health Insurance Portability & Accountability Act, the Visa Cardholder Information Security Plan, the Payment Card Industry (PCI) Data Security Standard, the National Credit Union Administration Guidelines, the Office of the Comptroller of the Currency Guidelines, the International Organization for Standardization 17799, Common Criteria Certification, California Civil Code Senate Bill 1386 (California Security Breach Information Act), or the like, including any amendments and/or successors to any of the above, or the like.

In various embodiments, a change audit method may be performed as part of an audit of an enterprise, including but not limited to, a financial accounting or statement audit. In some such embodiments, a change audit method may be performed to at least provide an audit trail for said audit.

In various embodiments where a change audit method is performed to maintain or demonstrate control of an enterprise's information technology infrastructure, financial systems or data, or business processes, use of a change audit method may occur in a number of areas, including but not limited to, access control, network security, auditing and monitoring of security-related events, or the like. In various embodiments where a change audit method is performed to maintain or demonstrate control of an enterprise's information technology infrastructure, financial systems or data, or business processes, said maintenance or demonstration of control may include other aspects of a enterprise's information technology infrastructure, financial systems or data, or business processes, respectively.

In various embodiments where a change audit method is performed as part of an audit of an enterprise, or to facilitate compliance with governmental laws/regulations, use of a change audit method may occur in a number of areas, including but not limited to, access control, network security, auditing and monitoring of security-related events, or the like. In various other embodiments, where a change audit method is performed as part of an audit of an enterprise, or to facilitate compliance with governmental laws/regulations, use of a change audit method may include other aspects of an enterprise audit or regulatory compliance procedures, respectively.

Figure 2:
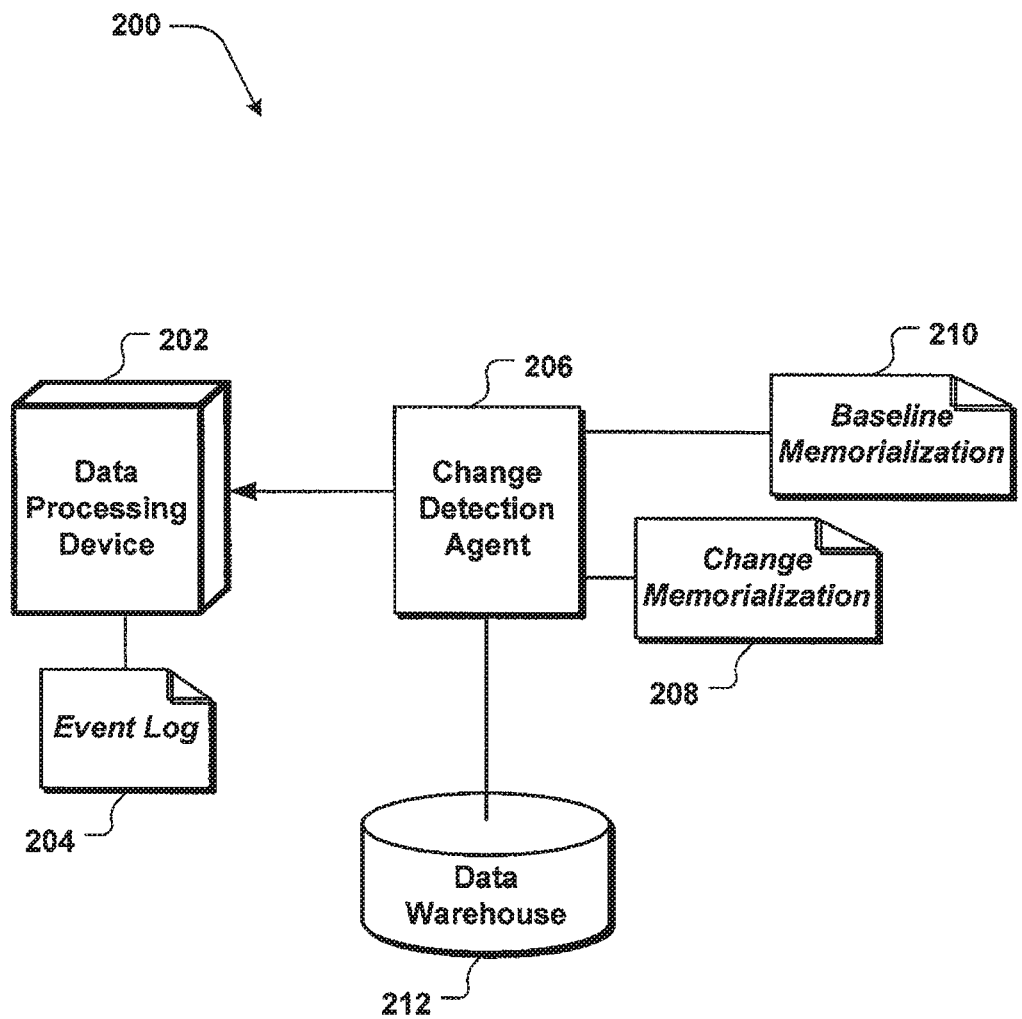
FIG. 2 schematically illustrates some aspects of an enrichment operation, in accordance with various embodiments of this invention.

FIG. 2 illustrates some aspects of an enrichment operation 200, in accordance with various embodiments of this invention. Illustrating a portion of a possible operational context in some embodiments, change detection agent 206 may facilitate detecting of a change to an element (not shown) of data processing device 202 of a data processing environment. In various embodiments, an element may comprise, for example, a file of data processing device 202. In various embodiments, an element may comprise another component of data processing device 202. In various embodiments, change detection agent 206 may detect a change in an element and may memorialize the change detected in change memorialization 208. In various embodiments, change memorialization 208 may comprise a memorialization of one or more changes detected in one or more elements of data processing device 202.

In various embodiments, change memorialization 208 may comprise a file. In various embodiments, change memorialization 208 may comprise a different type of memorialization of a change detected. In various embodiments, change detection agent 206 may facilitate detecting a change by facilitating taking a snapshot of a current state (not shown) of an element of data processing device 202, and may further compare the snapshot to a previously taken snapshot (not shown) of the element. In various embodiments, change detection agent 206 may facilitate taking a snapshot of a current state of an element of data processing device 202 in the course of facilitating taking a snapshot of a set of elements of data processing device 202.

In some embodiments, the previously taken snapshot may include a baseline state of the element, with FIG. 2 illustrating some such embodiments with baseline memorialization 210 including a baseline state of the element. In some embodiments, the previously taken snapshot may represent a state other than a current baseline state. In some embodiments, change detection agent 206 may facilitate obtaining the previously taken snapshot of the element. In some embodiments, the previously taken snapshot of the element may be obtained in another manner.

Illustrating a portion of a possible operational context in various embodiments, event log 204 may comprise a number of logged occurrences of events or simply logged events associated with elements of data processing device 202. For example, in the case of a file comprising one type of element, all occurred events, or a subset of the occurred events, associated with the file may be recorded in event log 204, in accordance with some embodiments. In various embodiments, examples of such logged events may comprise when the file is accessed, modified, etc. As data processing device 202 may represent a broad range of devices, event log 204 may correspondingly represent a broad range of event logs and their accompanying constituents, and may involve, for example, TACACS (Terminal Access Controller Access Control System), XTACACS (Extended TACACS), TACACS+, RADIUS (Remote Authentication Dial-In User Service), Diameter, any AAA (Authentication, Authorization and Accounting) protocol, LDAP (Lightweight Directory Access Protocol), and the like, including modifications, successors, and the like. Event logs may be referred to in a wide variety of ways, including audit logs, audit event logs, file audit logs, auto-logs, etc., with the term "audit" being used in a narrower context than used elsewhere herein in describing an audit of an enterprise, which may involve an examination and review of an enterprise's internal controls, information technology infrastructure, financial systems or data, business processes, financial accounting or reporting, etc.

In various embodiments, event log 204 may comprise a memorialization of one event or multiple events. In various embodiments, event log 204 may comprise a memorialization of one type of event, or multiple types of events. In various embodiments, event log 204 may comprise a running memorialization of events. In various embodiments, event log 204 may comprise events logged of one or more elements of data processing device 202. In various embodiments, event log 204 may reside on data processing device 202. In various other embodiments, event log 204 may reside elsewhere in data processing environment 200.

In various embodiments with one event log for data processing device 202, the event log may be created and/or updated by software of data processing device 202. In some such embodiments, the software may comprise an operating system (OS), or its equivalent, of data processing device 202, while in other such embodiments, the software may comprise software other than an OS, or its equivalent, of data processing device 202. In some embodiments with multiple event logs for data processing device 202, at least one of the event logs may be created and/or updated by software of data processing device 202. In some such embodiments, the software may comprise an OS, or its equivalent, of data processing device 202, while in other such embodiments, the software may comprise software other than an OS, or its equivalent, of data processing device 202.

In accordance with various embodiments, change detection agent 206 may be used to monitor the configuration, applications and underlying OS of security software and devices in order to detect and report change. In such embodiments, change detection agent 206 may provide independent validation that security applications and their configurations have not been compromised or changed without authorization.

Illustrating a portion of a possible operational context in various embodiments, change detection agent 206 may facilitate correlating the change to one or more events associated with the element. In various embodiments, change detection agent 206 may further report the detected change for the element, supplemented with one or more of the correlated events of the element. In some embodiments, the facilitating correlating may comprise retrieving the one or more events associated with the element from a repository of events of the data processing environment. In some embodiments, the repository of events may comprise event log 204. In some embodiments, the repository of events may comprise another data storage area of the data processing environment. In various embodiments, enrichment operation 200 may involve enriching at least some of the data stored in data warehouse 212 with events from a wide range of sources (not shown), such as, but not limited to, event or audit logs, a package manager, an installation engine of programs, etc.

In accordance with various embodiments of the present invention, change detection agent 206 provides independent change detection to thereby capture automated and manual changes, authorized and intended changes, as well as the occasional unauthorized, unintended, or potentially malicious change, in sufficient detail to determine the location, date, time, implementer, system, and the details of the change made. Change detection agent 206, in accordance with various embodiments, may ensure all authorized and/or intended changes are tracked and thus, verify that they were successfully made. Thus, change detection system 206 checks to see if what is being monitored has changed on servers and network devices and compares any detected changes of state with a baseline or desired state.

Additionally, in accordance with various embodiments of the present invention, change detection agent 206 may detect changes within data and/or data files. Change detection agent 206, in accordance with various embodiments, may be used to verify that records, documents, files, etc. have not been changed, altered or even deleted with respect to previous versions of records, documents, files, etc.

Figure 3:
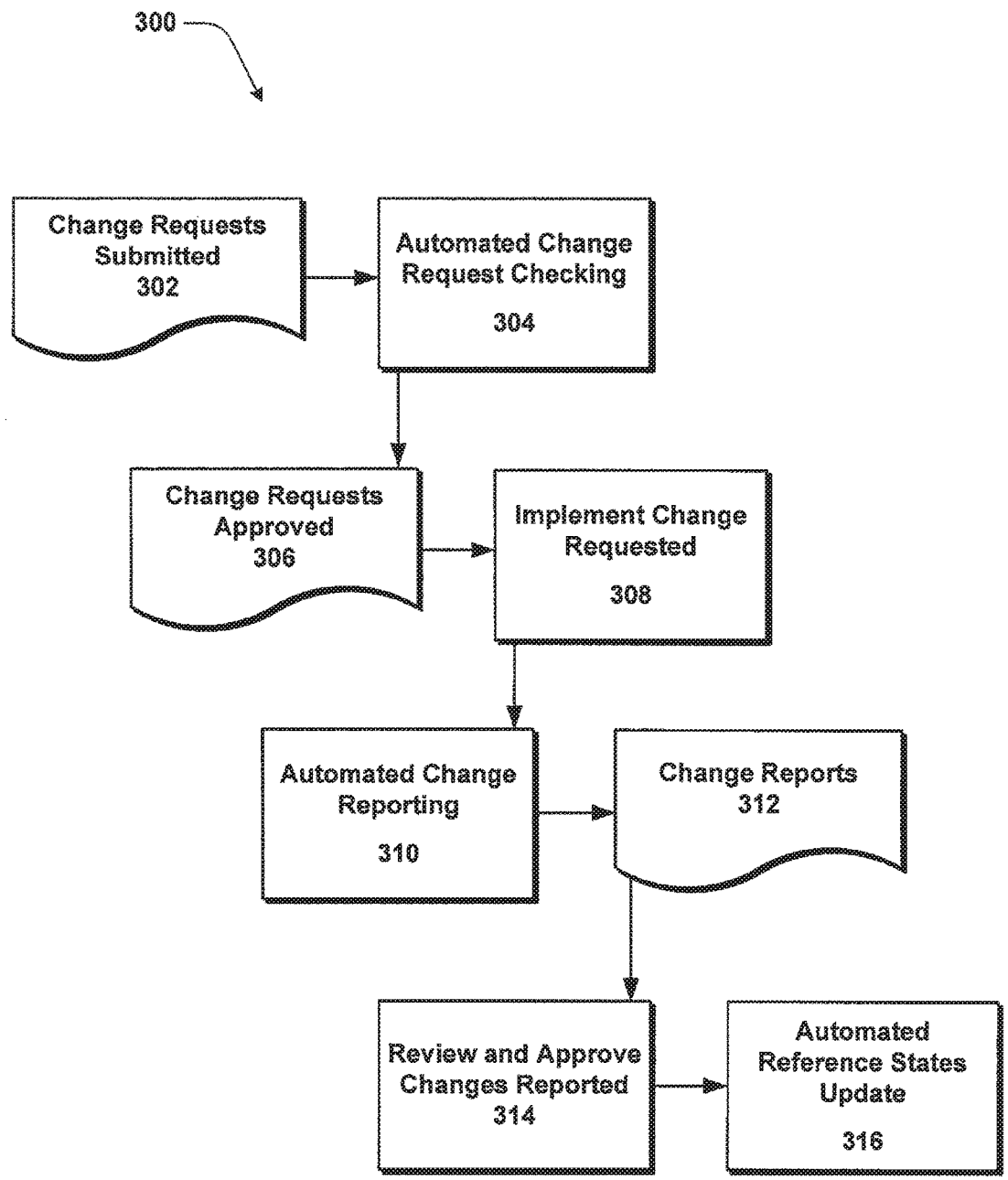
FIG. 3 schematically illustrates some aspects of an authorized reconciliation operation, in accordance with various embodiments of this invention.

FIG. 3 illustrates some aspects of an authorized reconciliation operation 300, in accordance with various embodiments of this invention. While certain operations are illustrated in FIG. 3, other operations may supplement or supplant the operations shown, in the context of various embodiments. Authorized reconciliation operation 300 may itself include various operations, such as some or all of the operations illustrated in FIG. 3. Authorized reconciliation operation 300 illustrates an exemplary change management process that may be practiced to manage changes to client devices of a data processing environment, in accordance with various embodiments. As illustrated, Change Requests 302 for requesting changes to hardware, software and/or data of various client devices may be submitted, for example, by various end users and/or IT administrators of a data processing environment. In various embodiments, Change Requests 302, having identification information identifying the elements to be changed, the changes to be applied, and/or dependency of the changes, may be stored in change request queues (not shown).

Further, as illustrated, Automated Change Request Checking 304 on the queued pending change requests may be performed periodically (or continuously) to approve or reject the requested changes. In various embodiments, change management services (not shown) may check the previously approved change requests in change request implementation queues (not shown) to determine whether all dependencies of each queued change request have been implemented (i.e., there is no change implementation pending for any identified change dependency of the change request).

For the illustrated embodiments, the change management services may reject all change requests having dependency on pending change implementations. The change management services may approve only change requests with no dependency on pending change implementations, illustrated as Change Requests Approved 306. In various embodiments, approved change requests may be moved from the change requests queues to the change request implementation queues for implementation scheduling and/or assignment to implementers.

In due course, the approved change requests may be implemented by the assigned implementer(s) at or about the scheduled time, 308. In various embodiments, on notification of implementation of a change request, an automated change reporting 310 may be performed by the change management services, resulting in Change Reports 312.

In various embodiments, the change management services may generate Change Reports 312 by comparing the current state of the applicable client device with its previously saved reference state. In various embodiments, Change Reports 312 may include a number of change records describing the various changes to the hardware, software, attributes, and/or data elements of the applicable client device, including, for example, the number of changes, dates, times, actions, operators, permissions, etc.

In various embodiments, Change Reports 312 may be subjected to Review and Approve Changes Reported 314 process. In various embodiments, such a review and approval process may be performed manually, or automated, in full or in part.

In various embodiments, on approval of the changes enumerated in a Change Reports 312 for a client device, the change management services may automatically generate and save the changes (Automated Reference States Update 316) in a new reference state for the applicable client device.

Figure 4:
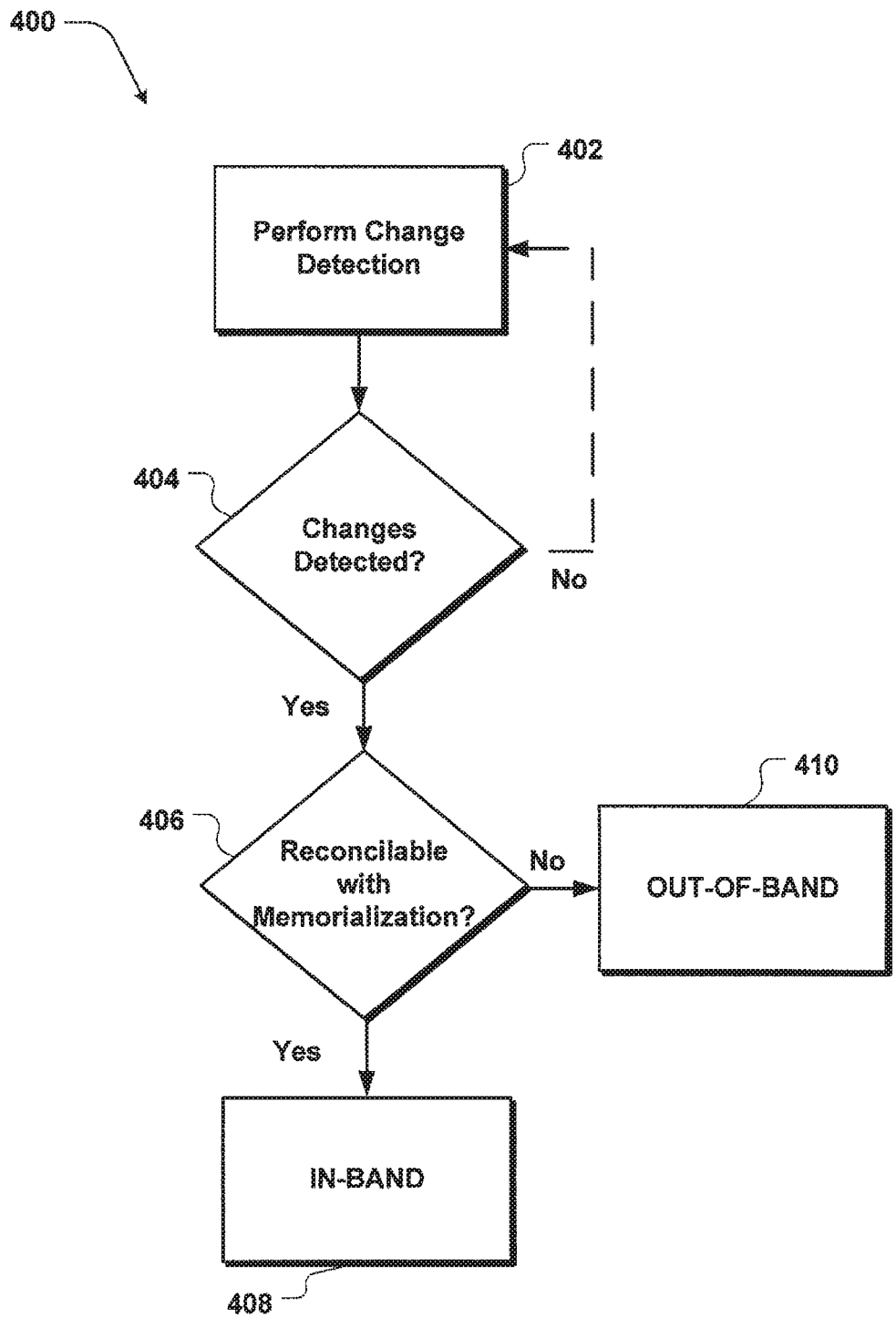
FIG. 4 schematically illustrates some aspects of an intended reconciliation operation, in accordance with various embodiments of this invention.

FIG. 4 illustrates some aspects of an intended reconciliation operation 400, in accordance with various embodiments of this invention. While certain operations are illustrated in FIG. 4, other operations may supplement or supplant the operations shown, in the context of various embodiments. Intended reconciliation operation 400 may itself include various operations, including operation, Perform Change Detection 402, where a change detection agent may perform one or more change detection operations to a data processing device. Perform Change Detection 402 may be followed by an operation determining whether changes were detected as a result of performing the one or more change detection operations, denoted as, Changes Detected? 404.

If operation 404 is determined in the affirmative, then operation, Reconcilable with Memorialization? 406, may follow in some embodiments. If operation 404 is determined in the negative, then operation, Perform Change Detection 402, may follow in some embodiments, either immediately, after a delay, at a future scheduled time, etc. In various other embodiments, operation 404 being determined in the negative may be followed by another operation (not shown) or may comprise an endpoint, either temporary or otherwise.

If Reconcilable with Memorialization? 406 is determined in the affirmative, then designation, IN-BAND 408, may follow in some embodiments. If operation 406 is determined in the negative, then designation, OUT-OF-BAND 410, may follow in some embodiments. In various other embodiments, operation 406 being determined in either the negative or the positive may be followed by various other operations (not shown). The sophistication of operation 406 may vary widely, depending on the implementation and the information available to make the reconciliation. The designation of IN-BAND 408 may be followed by various operations, including but not limited to, elevating the detected change(s) to a baseline state of the data processing device in issue. The designation of OUT-OF-BAND 410 may be followed by various operations, including but not limited to, alerting such a designation of a detected change.

Figure 5:
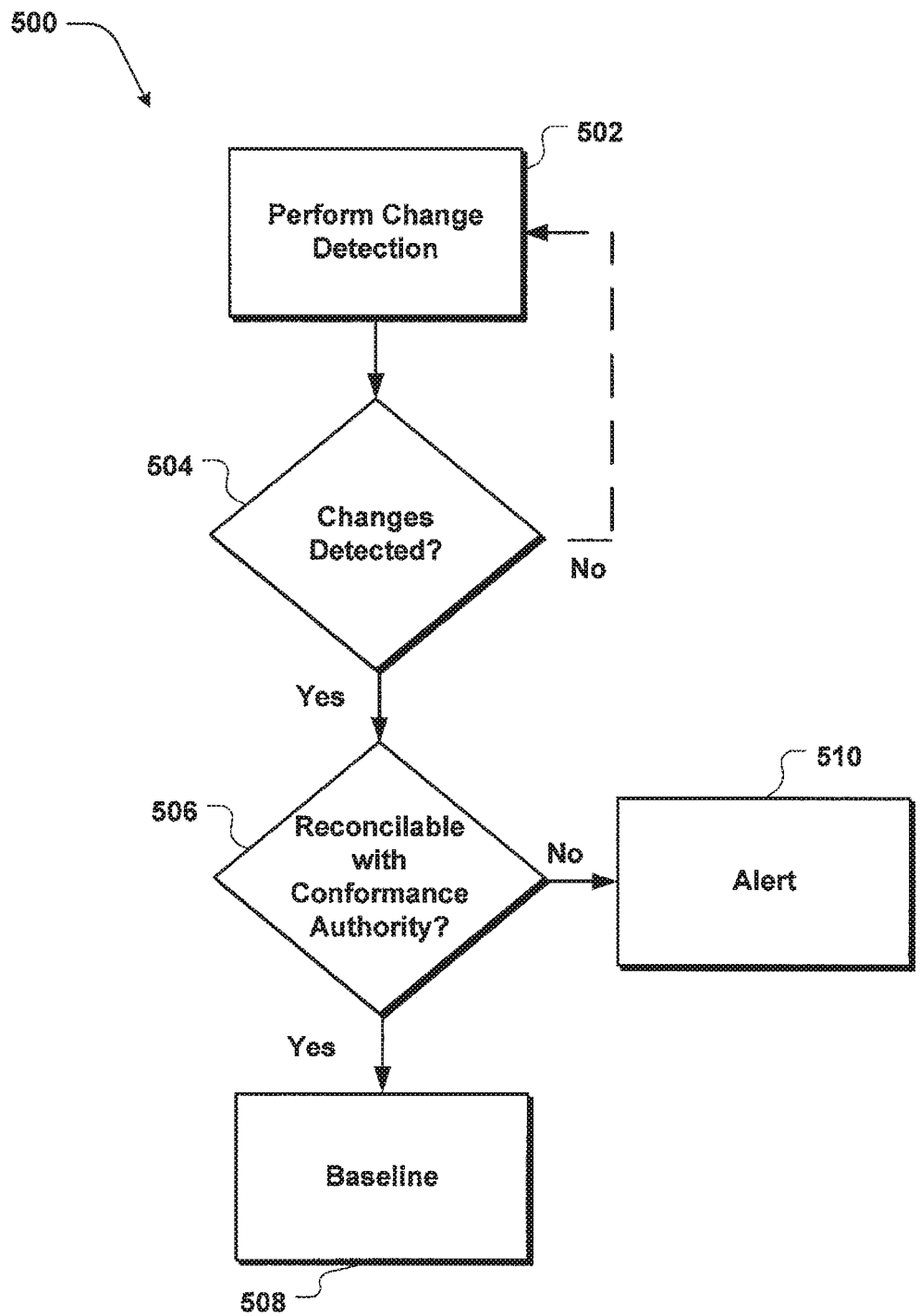
FIG. 5 schematically illustrates some aspects of a conforming reconciliation operation, in accordance with various embodiments of this invention.

FIG. 5 illustrates some aspects of a conforming reconciliation operation 500, in accordance with various embodiments of this invention. While certain operations are illustrated in FIG. 5, other operations may supplement or supplant the operations shown, in the context of various embodiments. Conforming reconciliation operation 500 may itself include various operations, including operation, Perform Change Detection 502, where a change detection agent may perform one or more change detection operations to a data processing device. Perform Change Detection 502 may be followed by an operation determining whether changes were detected as a result of performing the one or more change detection operations, denoted as Changes Detected? 504. In various embodiments, some change detection agents that perform operation, Changes Detected? 504, may additionally or alternatively include other operations.

If operation 504 is determined in the affirmative, then operation, Reconcilable with Conformance Authority? 506, may follow in some embodiments. If operation 504 is determined in the negative, then operation, Perform Change Detection 502, may follow in some embodiments, either immediately, after a delay, at a future scheduled time, etc. In various other embodiments, operation 504 being determined in the negative may be followed by another operation (not shown) or may comprise an endpoint, either temporary or otherwise.

If Reconcilable with Conformance Authority? 506 is determined in the affirmative, then operation Baseline 508, may follow in various embodiments. In various embodiments, Baseline 508 may include changing a baseline of an element of a data processing device to incorporate the change or changes detected in operation 504. Thus, in various embodiments a detected change may be deemed to be authorized and a system administrator may accept the change(s) and alter the baseline accordingly. In various embodiments, Baseline 508 may include additional or alternative sub-operations. In various embodiments, a baseline of an element may include a full version of the element. In various embodiments, a baseline of an element may include a text version of the element. In one such embodiment in the case where the element is a file, the baseline of the file may include a text version of the file. In various other embodiments, a baseline of an element may additionally or alternatively include other things, including but not limited to, attributes of the element.

In various embodiments, one or more additional operations other than Baseline 508 may follow an affirmative determination of Reconcilable with Conformance Authority? 506. In various embodiments, operation 506 being determined in the affirmative may be followed by modifying a severity state of the detected change (not shown), such as decreasing it. In various embodiments, operation 506 being determined in the affirmative may be followed by automatic approval of the detected change(s) without modification to the baseline state. In some other embodiments, no response may follow an affirmative determination of Reconcilable with Conformance Authority? 506.

If Reconcilable with Conformance Authority? 506 is determined in the negative, then operation, Alert 510, may follow in various embodiments. In various embodiments, Alert 510 may include alerting the nonconformance of a detected change, Alerting the nonconformance of a detected change may take many forms, according to various embodiments, including but not limited to, creating a helpdesk incident, alerting with a severity state indicator of the change in a GUI, notifying a user (for example, a system administrator) of the nonconforming change, reverting the element (or a portion of the element) back to its baseline state, etc. In various embodiments, operation 506 being determined in the negative may be followed by modifying a severity state of the change detected, such as increasing it. In various embodiments, Alert 510 may include facilitating a user to modify the element at issue to conform to at least one of the one or more guidelines of a conformance authority. In some embodiments, such facilitation may include reporting the one or more guidelines that were violated by the detected change. In various embodiments, such facilitation may include other sub-operations.

In various other embodiments, operation 506 being determined in the negative may be followed by various other operations. The sophistication of operation 506 may vary widely, depending on the implementation and the information available to make the reconciliation. In various embodiments, a further operation of determining one or more users associated with the detected change may be included. In various embodiments, Alert 510 may include the one or more users associated with the detected change. In some embodiments, the one or more users associated with the detected change may be the user(s) determined to have caused the change.

In accordance with various embodiments of the present invention, operation 506 being determined in the negative may result in automatically returning the element to a previous state or even, a baseline or desired state. Change detection agent 206 may verify that such a change has been made.

Figure 6:
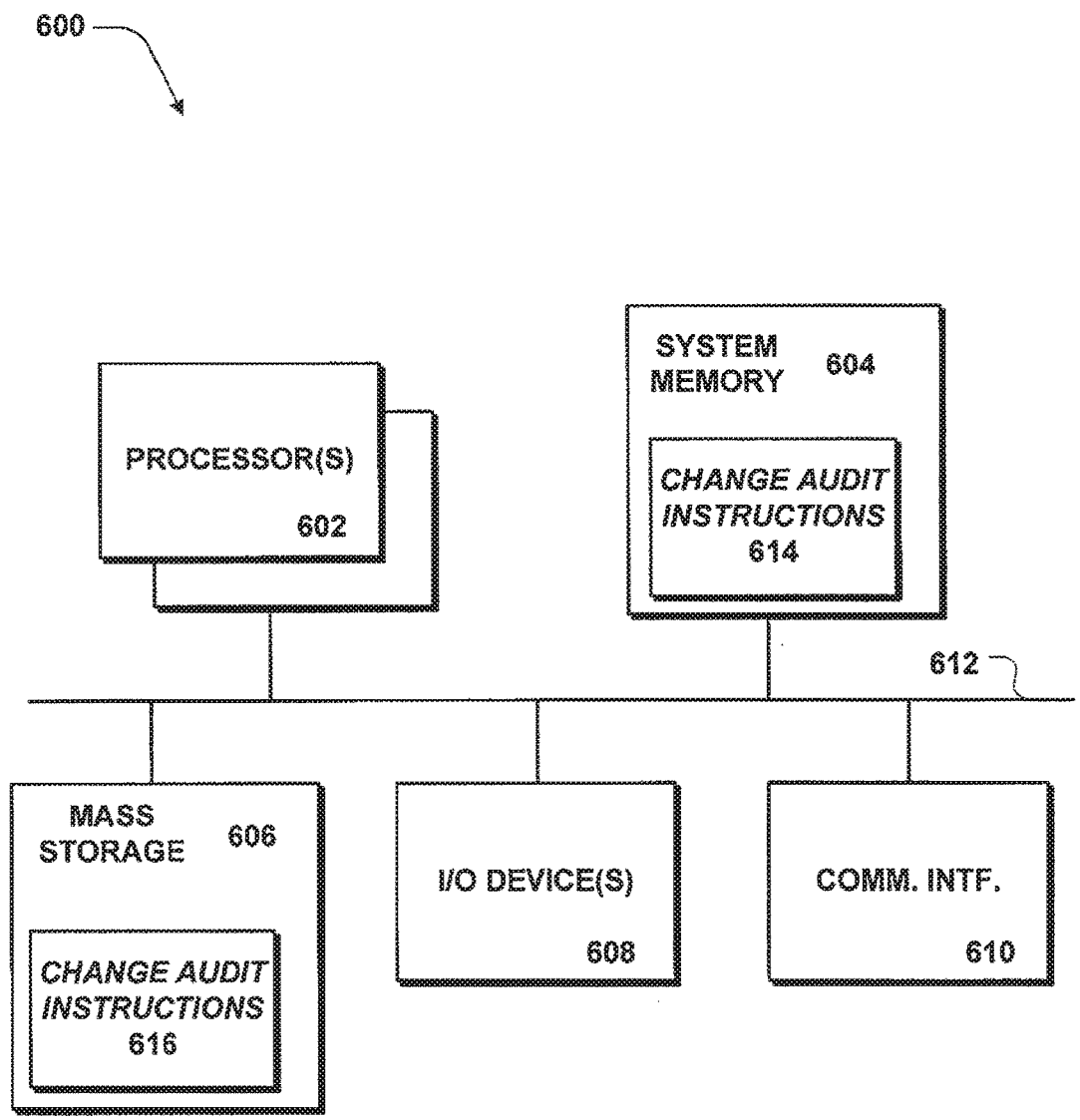
FIG. 6 schematically illustrates an example computer system suitable for use in association with a change audit method, in accordance with various embodiments of this invention.

FIG. 6 illustrates an example computer system suitable for use in association with a change audit method, in accordance with various embodiments of this invention. As shown, computer system 600 may include one or more processors 602 and may include system memory 604. Additionally, computer system 600 may include mass storage 606 in the form of one or more devices (such as diskette, hard drive, compact disk (CD), flash memory, and so forth), input/output devices 608 (such as keyboard, cursor control and on forth) and communication interfaces 610 (such as network interface cards, modems and so forth). The elements may be coupled to each other via system bus 612, which may represent one or more buses. In the case where system bus 612 represents multiple buses, the multiple buses may be bridged by one or more bus bridges not shown).

These elements each perform their conventional known in the art. In various embodiments, communication interfaces 610 may facilitate coupling of computing system 600 to a network, though which computing system 600 may be coupled to one or more data processing devices of a data processing environment and so forth, as necessary. In various embodiments, computing system 600 may at least be partially incorporated in such a data processing device. System memory 604 and mass storage 606 may be employed to store a working copy and a permanent copy of the programming instructions, illustrated as Change Audit Instructions 614 and 616, respectively, implementing various aspects of the one or more earlier described embodiments of the present invention. The permanent copy of the programming instructions may be loaded into mass storage 606 in the factory or in the field, through a distribution medium (not shown), or through communication interface 610 from, for example, a distribution server (not shown). The constitution of these elements 602-612 are known, and accordingly will not be further described. In alternate embodiments, part or all of the one or more modules may be implemented in hardware, for example, using one or more Application Specific Integrated Circuits (ASICs) instead.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for performing preventative, detective, and corrective control of an information technology (IT) infrastructure, comprising:
    detecting a change of state in at least one of a plurality of data processing devices in the information technology (IT) infrastructure, wherein the detecting is performed by comparing a baseline state for the at least one of the plurality of data processing devices to a current state of the at least one of the plurality of data processing devices and wherein the detecting is performed without knowledge of a source of the change of state;
    performing an enrichment operation by correlating the detected change of state to one or more events identified in a separate event or audit log, and supplementing the detected change of state with the correlated one or more events;
    after the detecting, reconciling the detected change of state as an authorized and planned change of state by determining whether the change of state is associated with a work ticket or maintenance window for the at least one of the plurality of data processing devices; and
    if the detected change of state is not an authorized and planned change of state, generating a notification to a system administrator reporting the detected change of state.

2. The method of claim 1, further comprising, if the change of state is an authorized and planned change of state, updating the baseline state for the at least one of a plurality of data processing devices to the current state.

3. The method of claim 1, wherein the reconciling further comprises determining whether the detected change of state is conforming to a regulatory or security standard.

4. The method of claim 3, wherein the reconciling further comprises changing the baseline state for the at least one data processing device only if the detected change of state is conforming to the regulatory or security standard.

5. The method of claim 3, wherein the reconciling further comprises determining at least one of a level of severity or non-conformance for the detected change of state, if the detected change of state is not conforming.

6. The method of claim 1, further comprising memorializing a detected change of state of the at least one of a plurality of data processing device by logging one or events in an event log.

7. The method of claim 1, wherein the method further comprises generating a change report for changes detected in the information technology (IT) infrastructure, including the change at the data processing node, the change report including one or more of an identification of one or more of a number of changes detected, dates of the changes detected, times of the changes detected, operators associated with the changes detected, or permissions related to the operators associated with the changes detected.

8. One or more nom-transitory computer medium storing computer-executable instructions which when executed by a computer cause the computer to perform a method, the method comprising:
    detecting a change of state in at least one of a plurality of data processing devices the information technology (IT) infrastructure, wherein the detecting is performed by comparing a baseline state for the at least one of the plurality of data processing devices to a current state of the at least one of the plurality of data processing devices and wherein the detecting is performed without knowledge of a source of the change of state;
    performing an enrichment operation by correlating the detected change of state to one or more events identified in a separate event or audit log, and supplementing the detected change of state with the correlated one or more events;
    after the detecting, reconciling the detected change of state as an authorized and planned change of state by determining whether the change of state is associated with a work ticket or maintenance window for the at least one of the plurality of data processing devices; and
    if the detected change of state is not an authorized and planned change of state, generating a notification to a system administrator reporting the detected change of state.

9. The one or more non-transitory computer medium of claim 8, wherein the method further comprises, if the change of state is an authorized and planned change of state, updating the baseline state for the at least one of a plurality of data processing devices to the current state.

10. The one or more non-transitory computer medium of claim 8, wherein the reconciling further comprises determining whether the detected change of state is conforming to a regulatory or security standard.

11. The one or more non-transitory computer medium of claim 10, wherein the reconciling further comprises changing the baseline state for the at least one data processing device only if the detected change of state is conforming to the regulatory or security standard.

12. The one or more non-transitory computer medium of claim 10, wherein the reconciling further comprises determining at least one of a level of severity or non-conformance for the detected change of state, if the detected change of state is not conforming.

13. The one or more non-transitory computer medium of claim 8, the method further comprising memorializing a detected change of state of the at least one of a plurality of data processing device by logging one or events in an event log.

14. The one or more non-transitory computer medium of claim 8, wherein the method further comprises generating a change report for changes detected in the information technology (IT) infrastructure, including the change at the data processing node, the change report including one or more of an identification of one or more of a number of changes detected, dates of the changes detected, times of the changes detected, operators associated with the changes detected, or permissions related to the operators associated with the changes detected.

* * * * *